United States Patent [19]

Ikeda et al.

[11] 4,015,205
[45] Mar. 29, 1977

[54] BASEBAND SIGNAL SWITCHING ARRANGEMENT FOR DIVERSITY RECEPTION IN A PCM RADIO COMMUNICATION SYSTEM

[75] Inventors: Kiyoshi Ikeda; Toshihiko Mitani, both of Tokyo, Japan

[73] Assignee: Nippon Electric Company, Ltd., Tokyo, Japan

[22] Filed: Feb. 17, 1976

[21] Appl. No.: 658,785

[30] Foreign Application Priority Data

Feb. 17, 1975   Japan .............................. 50-20264

[52] U.S. Cl. .................................. 325/304; 325/56
[51] Int. Cl.² ......................................... H04B 7/08
[58] Field of Search .................. 325/56, 58, 42, 44, 325/2, 3, 302, 304, 306; 178/69.5 R

[56] References Cited

UNITED STATES PATENTS 3,628,149   12/1971   Swan ................................. 325/304

Primary Examiner—Richard Murray
Assistant Examiner—Jin F. Ng
Attorney, Agent, or Firm—Sughrue, Rothwell, Mion, Zinn & Macpeak

[57] ABSTRACT

A baseband signal switching arrangement for diversity reception in a PCM communication system is disclosed. The switching arrangement is characterized by the provision of a 1/n write-in frequency-dividing counter in each receiving channel to count clock signals in response to being reset by a frame signal and $n$ buffer memory circuits for successively writing bit information of a received digital signal in response to the $n$ frequency-divided outputs of the 1/n frequency-dividing counter. The switching arrangement further includes a 1/n read-out frequency-dividing counter which is adapted to successively read out memory outputs of one set of the $n$ buffer memory circuits and a switching means for enabling the 1/n read-out frequency-dividing counter to selectively read out memory outputs of a given set of buffer memory circuits.

2 Claims, 8 Drawing Figures

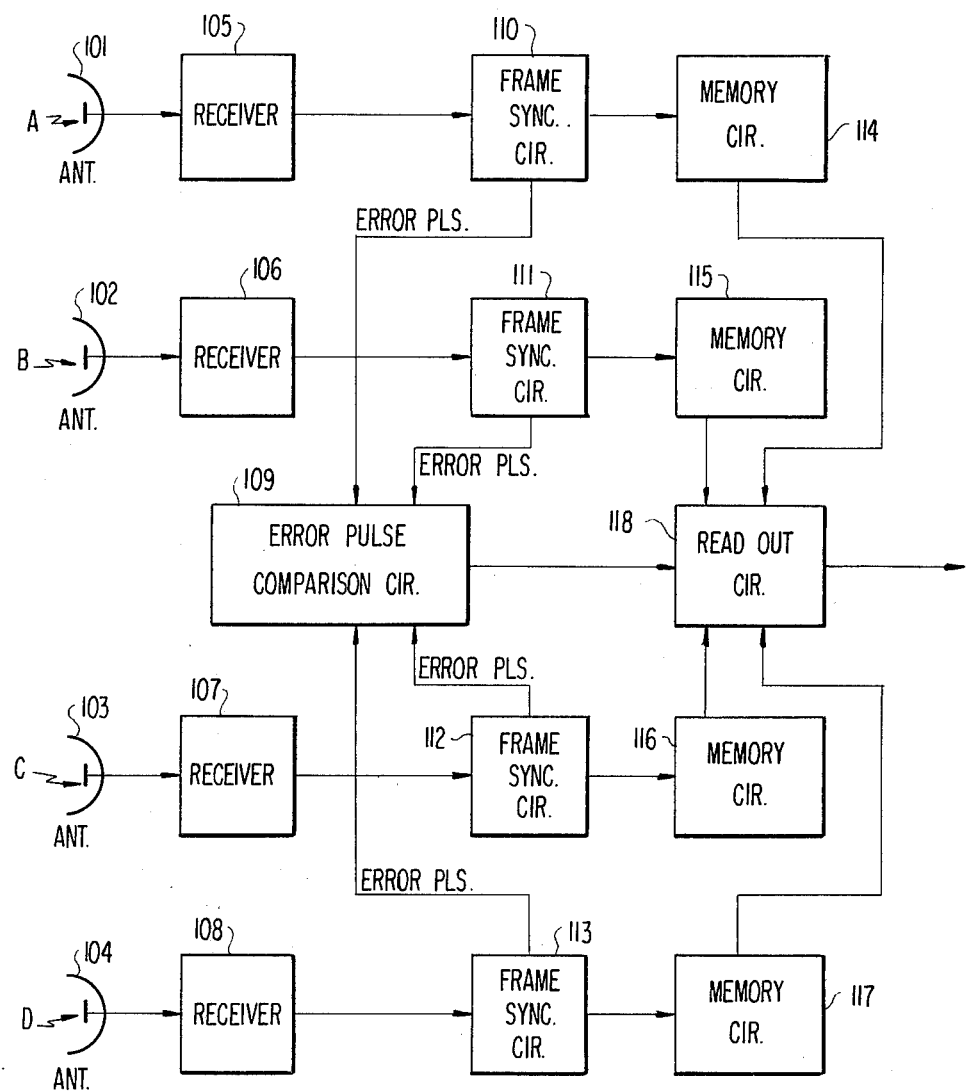

BASEBAND SIGNAL SWITCHING ARRANGEMENT FOR DIVERSITY RECEPTION IN A PCM RADIO COMMUNICATION SYSTEM

The present invention relates to a baseband signal switching arrangement for diversity reception in a PCM radio communication system.

Generally, in a radio communication system, diversity reception is used to avoid effects of fading. It is achieved by selecting signals received through two or more radio wave propagation paths provided therefor, and to thereby enhance the reliability of communication. As is well-known, the diversity reception systems include a space diversity reception system which uses receiving antennas placed in different locations to select signals received through a plurality of propagation paths, and a frequency diversity reception system which employs different carrier wave frequencies to select signals received through a plurality of propagation paths. Among these systems, one practical example of the space diversity reception system is described in an article published in "IEEE Transactions on Communication Technology" Vol. 15, No. 4, August 1967, pp 603 ~ 614. The selection of signals received through a plurality of propagation paths is normally effected either in an intermediate frequency band stage or in a baseband stage of the diversity receiver. In such a system, a signal propagated through a path that has been affected by fading is interrupted while another signal unaffected by fading is led to a receiver output. That is, when one of the plurality of propagation paths is switched over to another, momentary signal interruption is inevitably caused at the receiver output. Such signal interruption would not adversely affect the quality of the signal being received so long as an analog signal communication system is employed. Recently, however, digital signal communication is more commonly employed, and if the diversity reception system is applied to the digital communication, then the momentary signal interruption caused by switching of the propagation paths would result not only in momentary discontinuity of bits but also in the collapse of frame synchronism and consequent large bit errors in the receiver output. In addition, the variation of a relative delay time of the propagation paths upon generation of fading would result in large signal interruption as the digital transmission speed is increased, and it is very difficult to resolve this problem. For instance, at a digital transmission speed of about 20 Mb/s, the variation of a relative delay time causes the deviation of 2 bits or more.

SUMMARY OF THE INVENTION

One object of the present invention is to provide a baseband signal switching arrangement of diversity reception, in which one of the high speed digital signals received through a plurality of propagation paths can be selected without causing any bit errors in the output.

According to one feature of the present invention, there is provided a baseband signal switching arrangement, characterized in that in each baseband stage of a plurality of receiver channels, there are provided a $1/n$ write-in frequency dividing counter ($n$ being a positive integer equal to or larger than 2), which is adapted to count a clock signal in response to being reset by a frame signal, and $n$ buffer memory circuits for successively writing bit information of a received digital signal in response to the $n$ frequency-divided outputs of the $1/n$ frequency-dividing counter having their phases shifted in sequence, and that in common to the respective baseband stages, there are provided a $1/n$ read-out frequency-dividing counter, which is adapted to successively read out memory outputs of one set of the $n$ buffer memory circuits, and switching means for enabling the $1/n$ read-out frequency-dividing counter to selectively read out memory outputs of a given set of the respective buffer memory circuits.

BRIEF DESCRIPTION OF THE INVENTION

The above-mentioned and other features and objects of this invention will become more apparent by reference to the following description taken in conjunction with the accompanying drawings, in which:

FIG. 1 is a schematic block diagram of a baseband signal switching arrangement according to the present invention as applied to a diversity reception system;

FIGS. 2a and 2b, respectively, show an example of the detailed structure of the error pulse comparison circuit in FIG. 1 and a time chart for explaining the operation of said error pulse comparison circuit;

FIG. 3 is a block diagram showing one preferred embodiment of the baseband signal switching arrangement according to the present invention;

FIG. 4 is a circuit diagram showing a detailed circuit construction of the frequency-dividing counter for writing in FIG. 3;

FIG. 5 is a time chart for explaining the operation of the baseband signal switching arrangement shown in FIG. 3;

FIG. 6 is a similar time chart for explaining the switching operation of the baseband signal switching arrangement according to the present invention; and FIG. 7 is a block diagram showing one preferred embodiment of the baseband signal switching arrangement according to the present invention as applied to a quadruple diversity reception system.

Figure 2A:
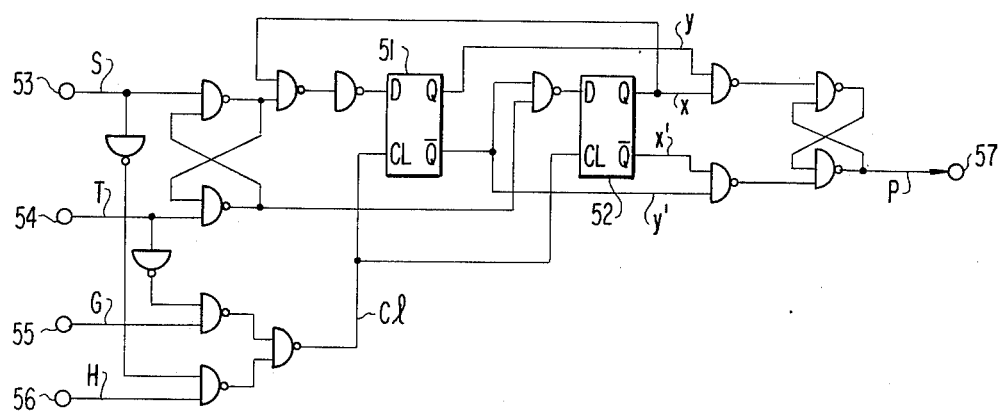
Figure 2B:
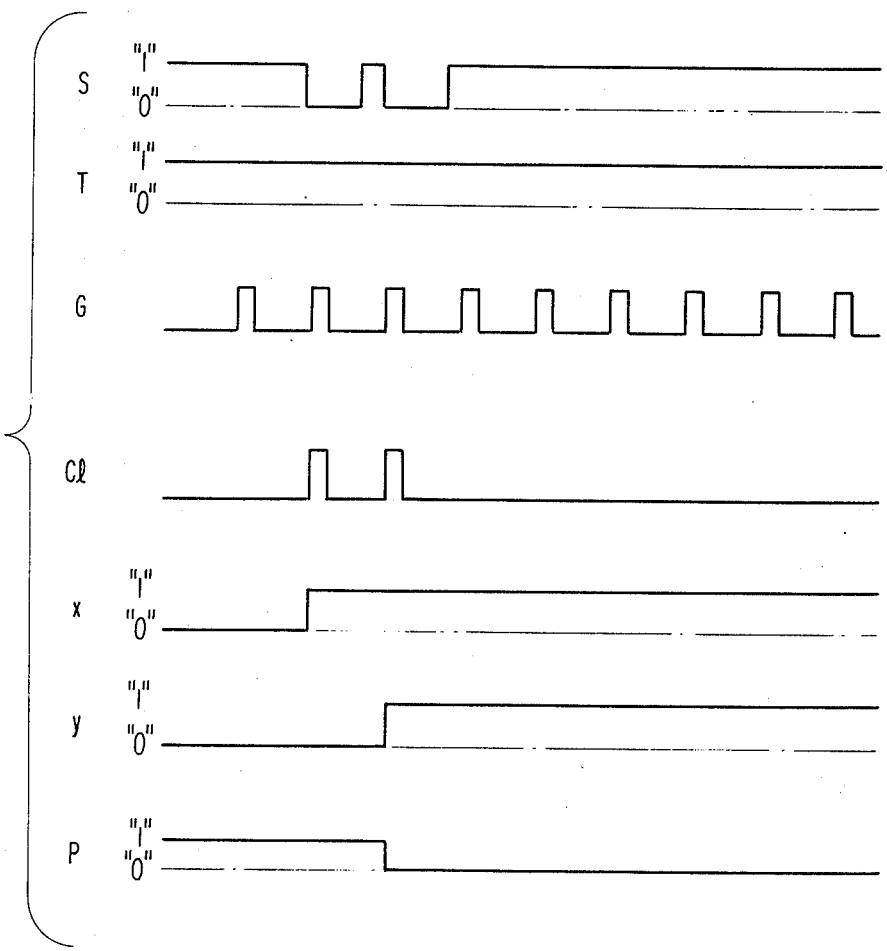

A description of an actual example of the error pulse comparison circuit 5 will now be given referring to FIGS. 2$a$ and 2$b$. In the prior art, this pulse comparison circuit is composed of two edge-triggered flip-flops, a number of NAND gates and a number of inverters. The error pulses S and T produced with the frame signal synchronizing circuits 13 and 14 are respectively fed to two input terminals 53 and 54. Also, the synchronized frame signals G and H are respectively applied to two separate terminals 55 and 56 in order to perform a triggering of the flip-flops. Now as shown in FIG. 2$b$, assuming that no error pulse is fed to the terminal 54, and successive error pulses are fed to the terminal 53, two frame pulses Cl gated by the error pulses S are respectively applied to CL-terminals of the flip-flops 51 and 52. An output $x$ at the Q-terminal of the flip-flop 52 is turned to a level 1 from a level 0 by the first pulse of the gated frame pulses Cl, and then an ouput $y$ at the Q-terminal of the flip-flop 51 is changed to a level 1 from a level 0 by the second pulse of the gated frame pulses Cl. At the same time, an output $x'$ of the flip-flop 52 is turned to 0, and also an output $y'$ of the flip-flop 51 is turned to 0. Thus, an output P is changed to a level 0 from a level 1 to perform the switch-over of the read out circuit.

Figure 1:
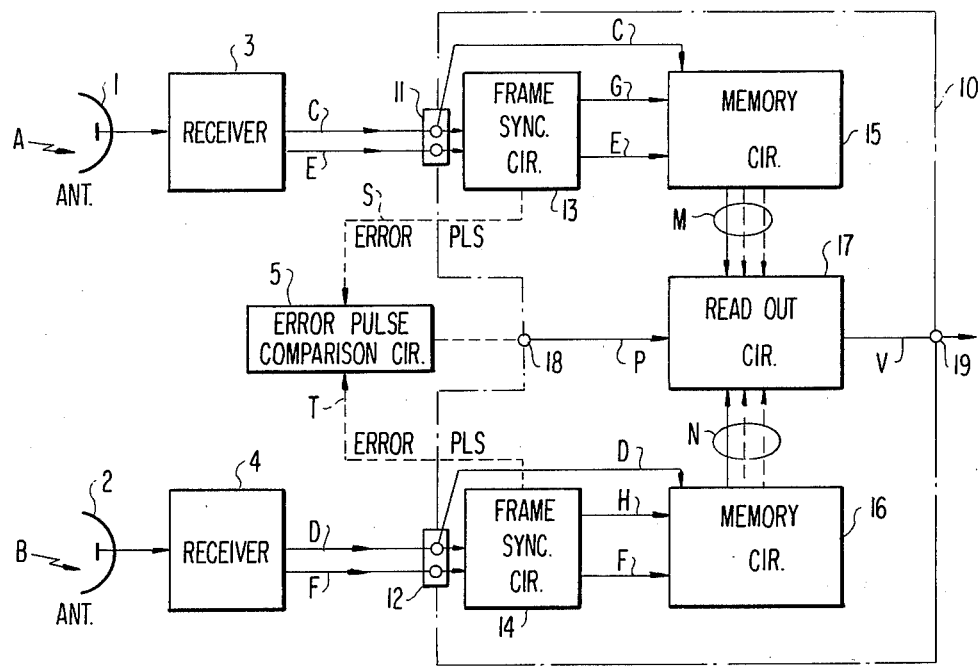
Referring now to FIG. 1 which shows the baseband signal switching arrangement according to the present invention as applied to a diversity reception system, antennas 1 and 2 respectively receive carrier waves modulated with digital signals containing the same information which have been propagated through a first and a second propagation paths A and B, and then the baseband digital signals C and D are demodulated by receivers 3 and 4, respectively, each containing a high frequency stage, an intermediate stage and a demodulator. In these receivers are also included clock signal regenerator circuits for extracting and regenerating clock signals from said demodulated digital signals, so that clock signals E and F are produced at their outputs. The digital signals C and D transmitted through the first and second propagation paths, respectively, and demodulated, are applied to the input terminals 11 and 12 of the baseband signal switching arrangement 10 along with the clock signals E and F, respectively. In the switching arrangement, frame signal synchronizing circuits 13 and 14, respectively, receive the digital signals as well as the clock signals fed through the input terminals 11 and 12 to produce frame signals G and H, respectively, which are applied to memory circuits 15 and 16, respectively, jointly with the clock signals E and F. Each of these memory circuits 15 and 16 is composed of $n$ buffer memory circuits which successively store the separately applied digital C or D for an $n$-times elongated bit length by means of a frequency-dividing counter for writing, which divides the clock signal frequency by a factor of $1/n$ ($n$ being 2 or larger positive integer) to generate $n$ series of signals having their phases shifted in sequence by one bit. The respective $n$ signals M and N which have been thus stored in the memory circuits 15 and 16, are applied to a read-out circuit 17 provided in common to them. Either one of the respective $n$ signals M and N stored in said memory circuits 15 and 16 can be read out by means of a frequency-dividing counter for reading, which divides the clock signal frequency by a factor of $1/n$ to generate $n$ series of signals having their phases shifted in sequence by one bit. It is to be noted that the aforementioned frequency-dividing counters for writing are repeatedly reset by the frame signals G and H, respectively, so that the successive bit informations may be allotted to the respective $n$ buffer memory circuits in correct order and every $n$-th bit information may be stored correctly in the same buffer memory circuit. Accordingly, bit information written in the respective corresponding buffer memory circuits of the two memory circuits 15 and 16 is respectively elongated in time by a factor of $n$, so that even if any deviation should arise in the arrival time of the bit information at the two receivers 3 and 4, it would be possible to find an overlapped moment therebetween in the $n$-times elongated storage period. If the switching in the read-out of the stored information is effected intentionally at this overlapped moment, then there would not occur momentary interruption of the bit information upon switching and further collapse of the frame synchronism or the like. In addition, in the above-described operation, which one of the stored signals M and N is read out is decided by instructions of a control signal P and, in response to the decision switching, is effected selectively in accordance with the timing of a clock signal generated in the read-out circuit 17. Although the switching control signal P can be issued through a manual operation, provision can be made as shown in FIG. 1 in which error pulses S and T produced in respective phase comparators included in the frame signal synchronizing circuits 13 and 14, respectively, and applied to a error pulse comparison circuit 5 to compare their error pulses with each other. A switching control signal P is fed from the error pulse comparison circuit 5 to the read out circuit 17, so that the output of the memory circuit on the side with the fading-affected error pulse may be disconnected, while the non-affected side may be read out.
Figure 3:
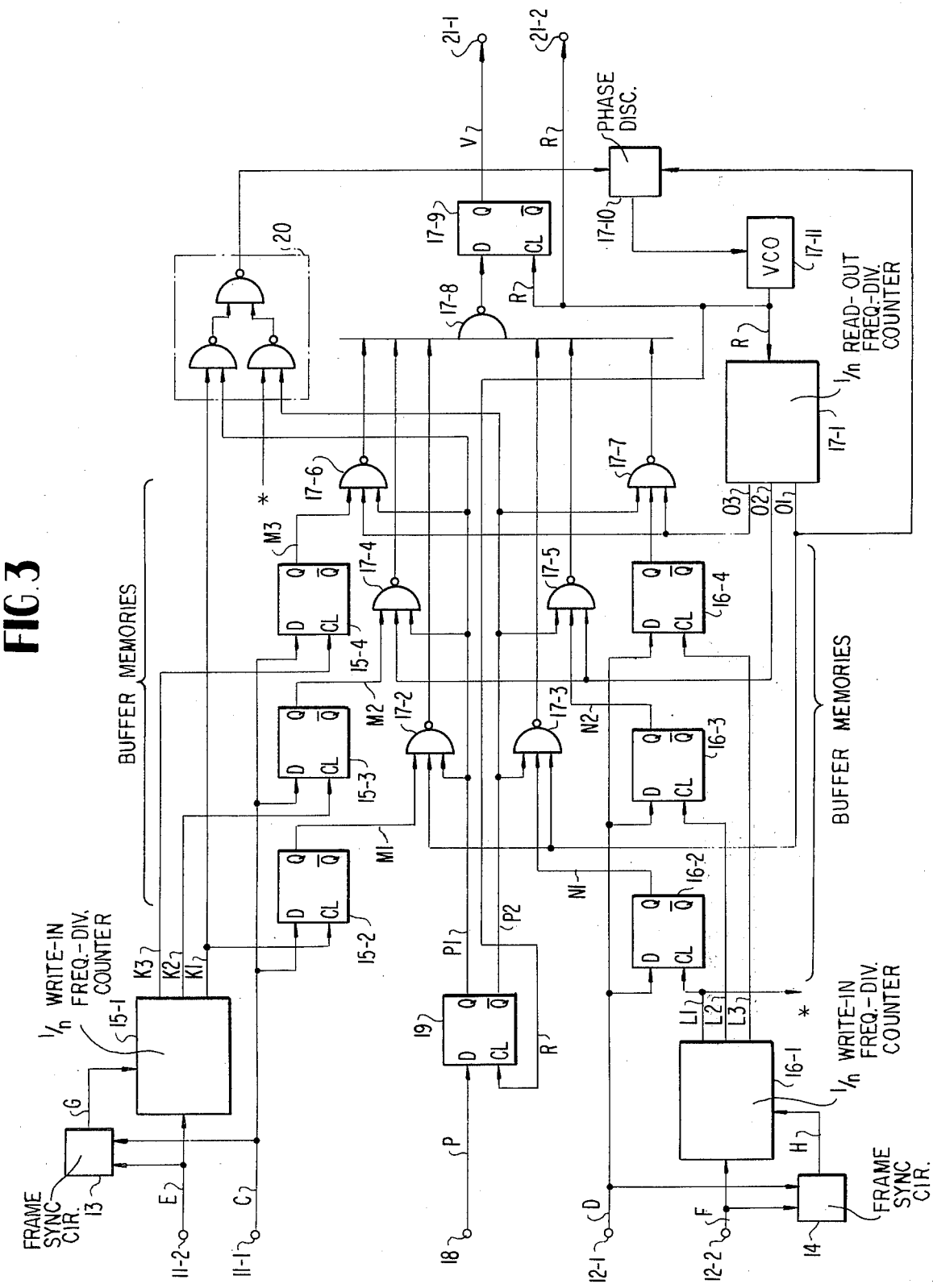

Now one preferred embodiment of the baseband signal switching arrangement of the present invention will be described in more detail with reference to FIG. 3. The digital signal C from the receiver 3 in FIG. 1 is fed to an input terminal 11-1, the clock signal E from the same is fed to an input terminal 11-2, the digital signal D from the receiver 4 is fed to an input terminal 12-1, and the clock signal F from the same is fed to an input terminal 12-2. The digital signal C at the terminal 11-1 and the clock signal E at the terminal 11-2 are applied to the frame signal synchronizing circuit 13, and a frame pulse signal G is produced thereby. Similarly, the digital signal D and the clock signal F are applied to the frame signal synchronizing circuit 14, and a frame synchronizing pulse H is produced at its output. The clock signal E at the terminal 11-2 is frequency-divided by a factor of $1/n$ in a frequency-dividing counter 15-1. This integer $n$ is selected so as to be an integral fraction of the number of bits in one frame of the digital signal. In the illustrated embodiment, $n = 3$ is assumed, so that 3-phase frequency-divided outputs are provided from the frequency-dividing counter 15-1 as $K_1$, $K_2$ and $K_3$. By means of these frequency-divided outputs, the digital signal at the terminal 11-1 is written in buffer memories 15-2, 15-3 and 15-4, respectively, each of which is constructed of an edge-triggered flip-flop. This frequency-dividing counter 15-1 is reset by the frame pulse G fed from the frame signal synchronizing circuit 13 in every frame. Likewise, the clock signal F at the input terminal 12-2 is frequency-divided by a factor of $1/n$ by means of a frequency-dividing counter 16-1, so that the digital signal D at the terminal 12-1 is successively written in buffer memories 16-2, 16-3 and 16-4 in response to the 3-phase frequency-divided output pulses $L_1$, $L_2$ and $L_3$. The frequency-dividing counter 16-1 is reset in every frame by the frame pulse H fed from the frame synchronizing circuit 4.

The respective Q-outputs of the buffer memories 15-2, 15-3 and 15-4 are fed to NAND gates 17-2, 17-4 and 17-6, respectively, while read-out pulses at outputs $O_1$, $O_2$ and $O_3$ of a frequency-dividing counter 17-1 are respectively fed to the second inputs of these NAND gates. Also, an output signal $P_1$ of an edge-triggered flip-flop circuit 19 that responds to a control signal P at a terminal 18, is commonly fed to the third inputs of these NAND gates. Accordingly, when the signal $P_1$ is at a higher level, the NAND gates 17-2, 17-4 and 17-6 are opened, so that the Q-outputs of the buffer memories 15-2, 15-3 and 15-4 are successively read out in response to the outputs $O_1$, $O_2$ and $O_3$ of the frequency-dividing counter for reading 17-1. These read outputs are fed to a flip-flop 17-9 via a NAND gate 17-8. On the other hand, in case that the control signal P is at a lower level, then an output signal $P_2$ from the $\overline{Q}$-output of the flip-flop circuit 19 gets a higher level. Since this output signal $P_2$ is commonly fed to NAND gates 17-3, 17-5 and 17-7, the Q-outputs of the buffer memories 16-2, 16-3 and 16-4 are successively read out in response to the outputs $O_1$, $O_2$ and $O_3$ of the frequency-dividing counter 17-1. The frequency-dividing counter 17-1. The frequency-dividing counter 17-1 counts output pulses R of a voltage-controlled oscillator 17-11. These pulses R are also fed to a clock terminal CL of the flip-flop 17-9, so that the digital signal applied from the NAND gate 17-8 is, after subjected to retiming, led from the Q-terminal to an output terminal 21-1 as a digital signal output V. In addition, either the output of the write-in frequency-dividing counter 15-1 or the output of the write-in frequency-dividing counter 16-1 is selected in a switching circuit 20 in response to a control signal at a higher level $P_1$ or $P_2$. The selected output is compared with the output of the read-out frequency dividing counter 17-1 with respect to their phases in a phase comparator 17-10. Then the oscillation phase of the oscillator 17-11 is automatically controlled by the output of the phase comparator 17-10.

Figure 4:
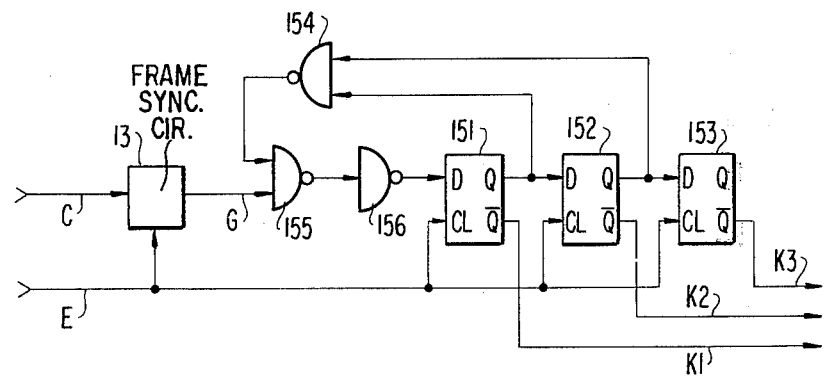

To describe now the practical construction of the above-described frequency-dividing counter 15-1 (or 16-1) in more detail with reference to FIG. 4, it has flip-flops 151, 152 and 153 in cascade connection. The Q-output of the first stage and the Q-output of the second stage are subjected to NAND operation in a NAND gate 154, and further, the output of this NAND gate 154 and the frame pulse G (or H) fed from the frame signal synchronizing circuit 13 (or 14) are applied to the input terminal D of the first stage flip-flop 151 via a NAND gate 155 and further through an inverter 156. To the respective clock input terminals CL of the flip-flops 151, 152 and 153 is applied a clock signal E (or F) fed through an input of this frequency-divider counter. In this way, from $\overline{Q}$ terminals of the respective flip-flops 151, 152 and 153 are obtained ⅓ frequency-divided output signals of one bit in width having their phases shifted in sequence one bit. The frame signal synchronizing circuit 13 (or 14) is composed of, for example, a phase comparator, a low-pass filter and a voltage-controlled oscillator having a frame period, in which by applying the frame synchronizing signal included in the input digital signal C (or D) and the output of the voltage-controlled oscillator to the phase comparator to compare their phases, a frame signal can be regenerated from the output of the voltage-controlled oscillator. It is to be noted that in FIG. 4, if the output of the NAND gate 154 is directly fed to the D-terminal of the first stage slip-flop 151 and the NAND gates 155, the inverter 156 and the frame signal synchronizing circuit 13 are omitted, then the read-out frequency-dividing counter 17-1 having a frequency-dividing factor of ⅓, can be obtained.

Figure 5:
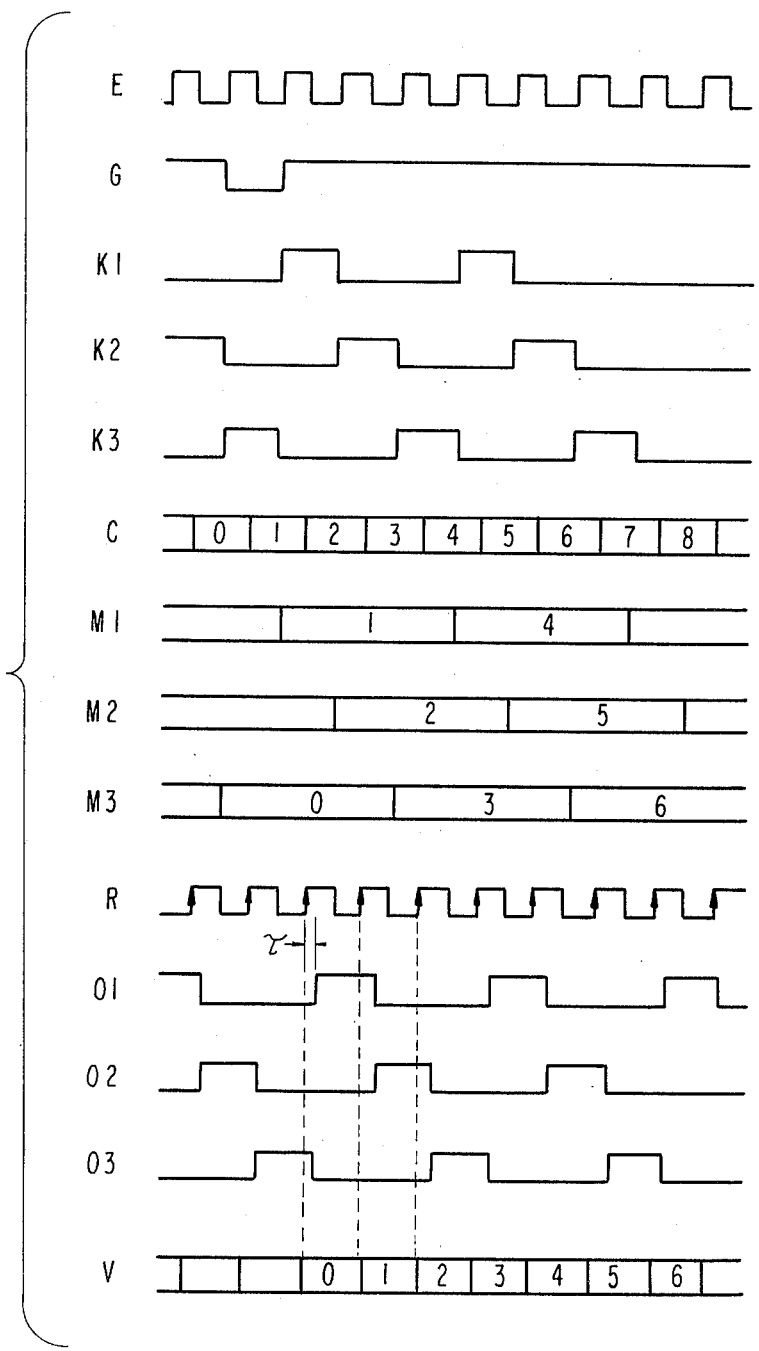

Now the operation of the embodiment shown in FIG. 3 will be further explained with reference to the time chart in FIG. 5. In case the frequency-dividing counter 15-1 is counting in response to the clock signal E at its input, this frequency-dividing counter is reset by the frame pulse G appearing at the output of the frame signal synchronizing circuit 13. The Q-output of the first stage flip-flop 151 is obtained in response to the next clock pulse as shown by the waveform $K_1$. The Q-output of the second stage flip-flop 152 is obtained in response to the second next clock pulse as shown by the waveform $K_2$. The Q-output of the third stage flip-flop 153 is obtained in response to the third next clock pulse as shown by the waveform $K_3$. Then the $K_1$ pulse is again obtained from the Q-output of the first stage flip-flop 151 in response to the further subsequent clock pulse, and similar operations are repeated further. In this way, three series of synchronizing pulses having their phases shifted by one bit can be obtained in response to the frame pulse. If a digital signal input represented by the waveform C is applied to the terminal 11-1, then in the buffer memory circuits 15-2, 15-3 and 15-4 are written the first bit, the second bit and the third bit, respectively, of the input digital signal C as represented by the waveforms $M_1$, $M_2$ and $M_3$, respectively, and the fourth bit is again recorded in the buffer memory 15-2. Accordingly, in each memory circuit is retained the same memory content for a period of 3 bits that is equivalent to the factor of frequency-division of 3 in the frequency-dividing counter 15-1. Such mode of operation is also true with respect to the frequency-dividing counter 16-1 to which the digital signal input D is applied, and the buffer memories 16-2, 16-3 and 16-4.

On the other hand, the digital signals applied to the terminals 11-1 and 12-1 are preliminarily compensated for fixed phase differences so that they may arrive at the receiver essentially at the same phase if there exists no fading. Therefore, the deviation in time between these two digital signal inputs is small. Accordingly, the phase difference between the bit information stored in the buffer memories 15-2, 15-3 and 15-4 and those stored in the buffer memories 16-2, 16-3 and 16-4 is also small. Although it makes no matter in such cases which series of the memory information is read out, the outputs of the frequency-dividing counter 17-1 are represented by the waveforms $O_1$, $O_2$ and $O_3$, respectively, assuming that the switching control signal $P_1$ in FIG. 3 is at a higher level. Accordingly, the information stored in the buffer memories 15-2, 15-3 and 15-4 and are passed through the gate circuits 17-2, 17-4 and 17-6 by these pulses $O_1$, $O_2$ and $O_3$, and read out by means of the flip-flop circuit 17-9 in response to the reading clock pulses represented by the waveform R. Thus, a digital signal output is obtained as shown by the waveform V. It is to be noted that the output pulses $O_1$, $O_2$ and $O_3$ of the frequency-dividing counter 17-1 are delayed by an appropriate time $\tau$ with respect to the clock pulses R so that the rise time of the respective pulses may not coincide with each other.

Figure 6:
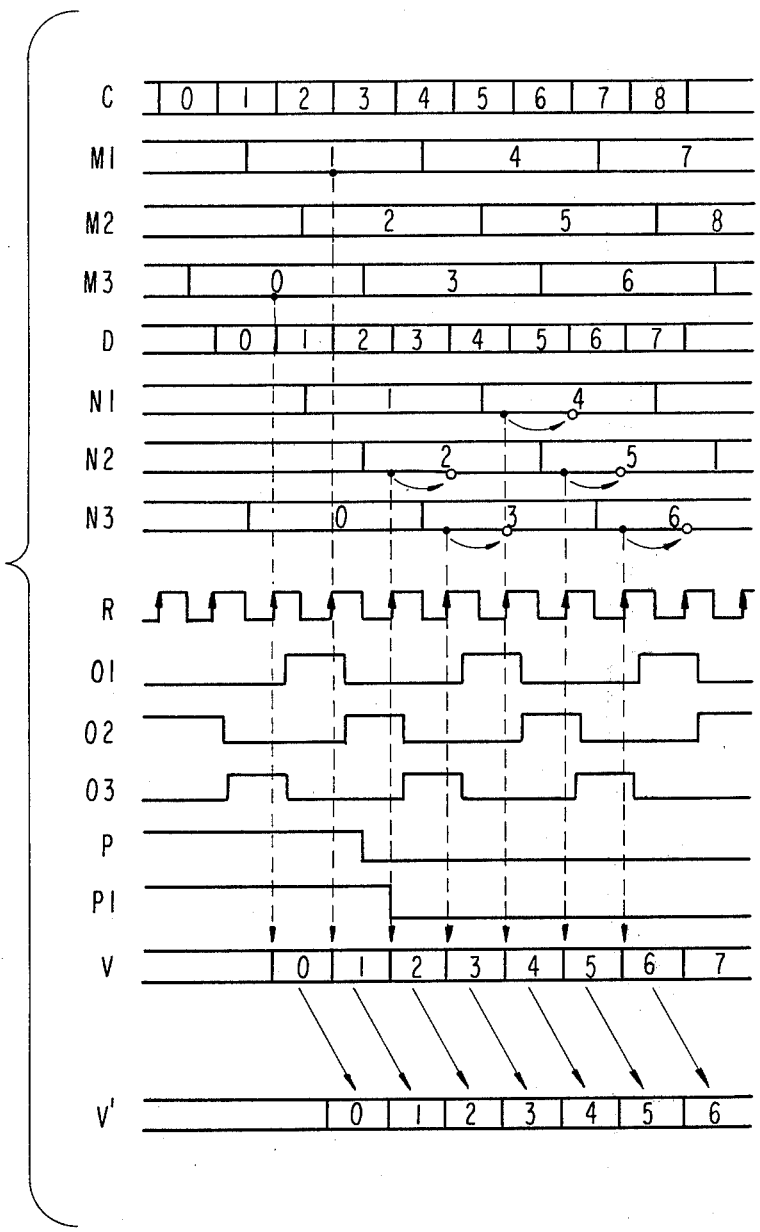

Next, in the embodiment shown in FIG. 3, the switching operation under the state where the phase of the digital signal received through the second propagation path is delayed by one bit with respect to the digital signal received through the first propagation path, will be described with reference to the time chart in FIG. 6. In this figure, the memory outputs of the buffer memories 15-2, 15-3 and 15-4 given in response to the digital signal input C are represented by $M_1$, $M_2$ and $M_3$, respectively, while the memory outputs of the buffer memories 16-2, 16-3 and 16-4 given in response to the digital signal input D are represented by $N_1$, $N_2$ and $N_3$, respectively. Assuming now that the control signal P is at a higher level, that is, the output $P_1$ of the flip-flop 19 is 1 and the output $P_2$ of the same is 0, then subsequent to the zero-th bit in the stored $M_3$ series, the first bit in the stored $M_1$ series is read out at the leading edge of the clock pulse R within the time provided of the $O_1$ pulse subsequent to the $O_3$ pulse of the frequency dividing counter 17-1, as shown by the waveform V which includes a bit interval designated by numeral 1 subsequent to a bit interval designated by numeral 0. Now, if the control signal P is turned to a lower level for the purpose of switching during the period when the first bit is being read out in the output signal V, then at the leading edge of the pulse appearing immediately there-after in the clock signal R, the output $P_2$ of the flip-flop 19 is turned to 1 while the output $P_1$ of the same is turned to 0, so that the read-out operation of the information stored in the buffer memory circuits is switched from the M-output side to the N-output side. Accordingly, at the rising point of the clock signal R when the control signal $P_2$ is turned to 1, within the time period of the $O_2$ pulse of the frequency-dividing counter 17-1, the preliminarily stored second bit in the $N_2$ series is read out. Subsequently, as represented by the waveform V, the third bit in the $N_3$ series, the fourth bit in the $N_1$ series, etc. are read out in sequence. Upon switching of the buffer memory groups for reading out the stored information as described above, the output of the switching circuit 20 to be applied to the phase comparator 17-10 is simultaneously switched from the frequency-dividing counter 15-1 to the frequency-dividing counter 16-1. However, the output phase of the voltage controlled oscillator 17-11 would change slowly because of a flywheel effect of this oscillator. Then, the output phase would settle to a stationary state, for instance, after several thousand bits. In FIG. 6, the waveform V' represents the bit stream at the state where the output phase has settled after the switching. As described above, even upon switching, not only would there not occur interruption or overlapping of the bit information, but also an abrupt phase change would not arise, and, therefore, a stable synchronized state can be maintained.

While the above-described embodiment has been for the simplest diversity reception application, the present invention is equally applicable to a diversity reception system having three or more propagation paths. Now a modified embodiment of the present invention as applied to a quadruple diversity reception system will be described with reference to FIG. 7. For propagation paths A, B, C and D there are provided four units of combinations of antennas 101, 102, 103 and 104, receivers 105, 106, 107 and 108, frame synchronizing circuits 110, 111, 112 and 113, and memory circuits 114, 115, 116 and 117. A read-out circuit 118 selectively switches the memory information in the memory circuits 114, 115, 116 and 117 under control of a control signal. The respective error pulse outputs of the frame synchronizing circuits 110, 111, 112 and 113 are applied to an error pulse comparison circuit 109 to compare these four error pulse outputs with respect to existence or non-existence of errors and to emit at its output switching control signals among for four circuits so that control signals are led to the read-out circuit 118. It is to be noted that in the above-described circuit arrangement, the functions possessed by the frame synchronizing circuit, memory circuit and read-out circuit are exactly the same as those explained in connection to the embodiment shown in FIG. 1.

As described above, according to the present invention, even if a relative delay time exceeding one bit exists between a plurality of baseband digital signals encoded with the same information, one of these digital signals can be selectively switched without causing bit errors resulting from the momentaly signal interruption.

Since many changes can be made in the above-described construction and many apparently widely different embodiments of this invention can be made without departing from the scope thereof, it is to be understood that the above description and accompanying drawings shall be interpreted as illustrative and not in a limiting sense.

What is claimed is:

1. A baseband signal switching arrangement for diversity reception in PCM communication system of the type having a receiver for each of a plurality of propagation paths, said switching arrangement comprising:
   a plurality of $1/n$ write-in frequency-dividing counters ($n$ being a positive integer equal to or larger than 2), said $1/n$ write-in frequency-dividing counters being provided at respective baseband stages of the receivers for said plurality of propogation paths, each of the receivers including clock signal regenerating circuits for producing clock signals and frame synchronization circuits for producing error pulses and frame signals, said $1/n$ write-in counters counting said clock signals in response to being reset by a frame signal;
   $n$ buffer memory circuits for successively writing bit information of a received PCM signal at each of said baseband stages in response to the $n$ frequency-divided outputs of the corresponding $1/n$ frequency-dividing counter, said outputs having their phases shifted in sequence;
   a $1/n$ read-out frequency-dividing counter provided in common to all of said baseband stages to successively read out memory outputs of one set of said $n$ buffer memory circuits; and
   switching means responsive to said error pulses for enabling said $1/n$ read-out frequency-dividing counter to selectively read out memory outputs of a given set of said $n$ buffer memory circuits.

2. A baseband signal switching arrangement as recited in claim 1 switching means comprises:
   an error pulse comparator circuit responsive to error pulses and frame signals from each of said frame synchronizing circuits for generating gating signals;
   first gating means connected to said $n$ buffer memory circuits and responsive to said gating signals and the outputs of said $1/n$ read-out frequency-dividing counter for providing as an output said successively read out memory outputs;
   second gating means connected to each of said $1/n$ write-in frequency-dividing counters and responsive to said gating signals for providing as an output corresponding to a preselected phase output of the $1/n$ write-in frequency-dividing counter corresponding to the set of $n$ buffer memory circuits selected to be read out;
   a phase comparator connected to receive as inputs the output of said second gating means and the output of the $1/n$ read-out frequency-dividing counter corresponding to the same preselected phase output as provided at the output of said second gating means; and
   a voltage-controlled oscillator responsive to an error voltage produced by said phase comparator for generating clock signals which are counted by said $1/n$ read-out frequency-dividing counter.

* * * * *